United States Patent [19]

Ozawa et al.

[11] 4,394,669

[45] Jul. 19, 1983

[54] LIQUID JET RECORDING APPARATUS

[75] Inventors: Masakazu Ozawa, Yokohama; Kunio Watanabe; Shigeyuki Matsumoto, both of Kawasaki; Yukuo Nishimura, Sagamihara; Takashi Miyazaki, Tokyo, all of Japan

[73] Assignee: Canon Kabushiki Kaisha, Tokyo, Japan

[21] Appl. No.: 280,348

[22] Filed: Jul. 6, 1981

[30] Foreign Application Priority Data

Jul. 22, 1980 [JP] Japan ................................ 55-100085
Jul. 22, 1980 [JP] Japan ................................ 55-100086

[51] Int. Cl.³ ............................................ G01D 15/18
[52] U.S. Cl. .................................... 346/140 R; 346/75
[58] Field of Search ........................... 346/75, 140 PD

[56] References Cited

U.S. PATENT DOCUMENTS

| | | | |
|---|---|---|---|
| 3,787,884 | 1/1974 | Demer | 346/75 |
| 4,300,145 | 11/1981 | van Raamsdonk | 346/140 PD |
| 4,323,907 | 4/1982 | Italiano | 346/140 PD |

*Primary Examiner*—George H. Miller, Jr.
*Attorney, Agent, or Firm*—Fitzpatrick, Cella, Harper & Scinto

[57] ABSTRACT

A liquid jet recording apparatus comprises a first ink tank for storing an amount of ink, a second ink tank for receiving the ink from said first tank through a feed tube, a recording head for jetting the ink fed from said second tank, and a carriage for reciprocally moving said second ink tank and recording head together, characterized in that at least a portion of said feed tube is lengthwise moved following the movement of said second ink tank along the course of its reciprocation and thereby the ink is fed to said second ink tank from said first ink tank.

5 Claims, 5 Drawing Figures

LIQUID JET RECORDING APPARATUS

BACKGROUND OF THE INVENTION

1. Field of the Invention

The present invention relates to a liquid jet recording apparatus and more particularly to a type of liquid jet recording apparatus comprising an ink jet type recording head, a subsidiary tank for feeding ink to the recording head and a main tank containing ink to be supplied to the subsidiary tank.

2. Description of the Prior Art

The recording head used in ink jet recording apparatus has a jet flow channel provided with an ink jet orifice at its tip end for forming flying droplets. During a rest time of operation of the apparatus, the ink in the jet flow channel often gets dried into solid which blocks the flow channel. Thus, a trouble called blocking is caused thereby. Also, the apparatus often suffers a trouble of meniscus retrogradation. As is well known, a meniscus is formed in the fore part of the ink jet channel. Vibration, impact and other force applied to the apparatus during the time the apparatus is being transported often causes the formed meniscus to move backwards which may result in poor printing or inability to effect printing. This is the trouble of meniscus retrogradation. Even when the apparatus is in printing operation, trouble may be caused by fiber dust from the recording paper, dust from the atmosphere and foreign matters in the ink. These dusts and foreign matters sometimes block the ink flow channel, which also brings about poor printing or inability to effect printing.

Such trouble, when once occurred, must be removed by employing any suitable means. One of the methods conventionally used for this purpose is to use a negative pressure applying means such as suction pump or suction bomb. Such negative pressure applying means is attached to the fore end of the ink flow channel every time there is trouble to suck the ink and to carry out cleaning of the blocked channel. Another conventional method is to use a liquid in which the ink is soluble. The ink dissolving liquid is applied to the solidified ink to dissolve it thereby restoring the condition of the channel to its original state for good jet of ink droplets.

However, the conventional methods mentioned above have some drawbacks. These methods are effective to recover good printing conditions only when some amount of ink is present in an ink tank communicating with the recording head. If the ink tank is vacant, an ink sucking operation will cause air to be sucked into the liquid passage within the recording head. In this case, the printing apparatus also produces a poor result or becomes unable to effect printing. The ink tank may be emptied by over-suction. In the case of apparatus having a movable ink tank and a stationary ink tank, if the connection line between the two tanks is blocked, no ink can be supplied to the movable tank from the stationary one. Under such condition, the movable tank will be emptied soon. Also, there is the case wherein the movable ink tank is emptied by ink evaporation in the movable ink tank itself and also in the connection line, or the like. When there remains no ink in the ink tank, an application of ink suction for removing a blockage of printing will cause another important problem. Therefore, in this case, it has conventionally been required to supply ink to the emptied movable tank, as a pretreatment, prior to the suction. However, this involves a problem in particular for such type of apparatus which has a separate ink suction mechanism provided only for recovery of the printing condition and operable independently of an ink feeding mechanism. In this case, when a trouble of poor printing or printing inability occurs in the apparatus, man can not determine which mechanism should be used, ink feeding mechanism or ink suction mechanism unless the cause for the occurred trouble is ascertained. If an ink suction is done erroneously although the movable ink tank contains no ink, then a permanent problem of inability to print may be caused thereby. To prevent such a important problem, there has already been proposed, for example, an apparatus provided with means for detecting the volume of ink remaining in the movable and stationary ink tanks. However, the provision of such additional detection means has made the apparatus very complicated and difficult to be compactly manufactured at a reduced cost.

In the case of ink jet recording apparatus, it is essentially important to smoothly and stably supply ink to the recording head during operation. It is impossible to form flying droplets from the ink jetted from the orifice with high reproducibility and in a stable manner and, therefore, to obtain high quality recorded images unless smooth and stable ink supply to the recording head is assured. With respect to the smooth and stable ink supply, all of the known apparatus are unsatisfactory and still have some problems to be solved.

Further, in the case of such type of apparatus in which the recording head reciprocates at a high speed, it has been found that the reciprocation of the recording head has a great adverse effect on the ink supply to the recording head from the ink tank. For example, the ink supply to the recording head is occasionally interrupted and the amount of ink supplied to the head is made unstable. There is also known in the art a type of apparatus designed as a closed system in which the liquid flow line extending from the ink tank to the tip end of the recording head is completely closed from the atmosphere except for the jet orifice formed at the fore part of the line. For such closed system, it is essential to assure a smooth and prompt ink supply following the ink jetting operation of the recording head during recording. With respect to this point, apparatus hitherto known is not satisfactory and has some problems to be solved.

SUMMARY OF THE INVENTION

Accordingly it is a general object of the invention to solve the technical problems mentioned above.

It is a more specific object of the invention to provide a liquid jet recording apparatus in which entrance of air into the ink flow line to the head can be surely prevented during the operation of ink supply to the head or during the operation for recovery of printing condition and in which the recovery of printing condition can be made without fail.

It is another object of the invention to provide a liquid jet recording apparatus which is simple in structure, small in size and low in cost and in which the ink can be supplied to the recording head smoothly and promptly during recording operation.

To attain the above objects according to the invention there is provided a liquid jet recording apparatus comprising a first ink tank for storing an amount of ink, a second ink tank for receiving the ink from said first tank through a feed tube, a recording head for jetting the ink fed from said second tank, and a carriage for reciprocally moving said second ink tank and recording head together, characterized in that at least a portion of said feed tube is moved lengthwise following the movement of said second ink tank along the course of its reciprocation and thereby the ink is fed to said second ink tank from said first ink tank.

Other and further objects, features and advantages of the invention will appear more fully from the following description taken in connection with the accompanying drawings.

BRIEF DESCRIPTION OF THE DRAWINGS

FIGS. 1A to 1C illustrate a preferred embodiment of the invention of which FIG. 1A is a schematic perspective view thereof, FIG. 1B is a schematic sectional view of the essential part thereof and FIG. 1C is a schematic rear elevation thereof; and FIGS. 2A and 2B illustrate an example of the recording head mounted on the recording apparatus according to the invention, of which FIG. 2A is a schematic perspective view of the head and FIG. 2B is a schematic plane view showing the structure of the heating element base plate 205 of the recording head 201.

DETAILED DESCRIPTION OF PREFERRED EMBODIMENTS

Figure 1A:
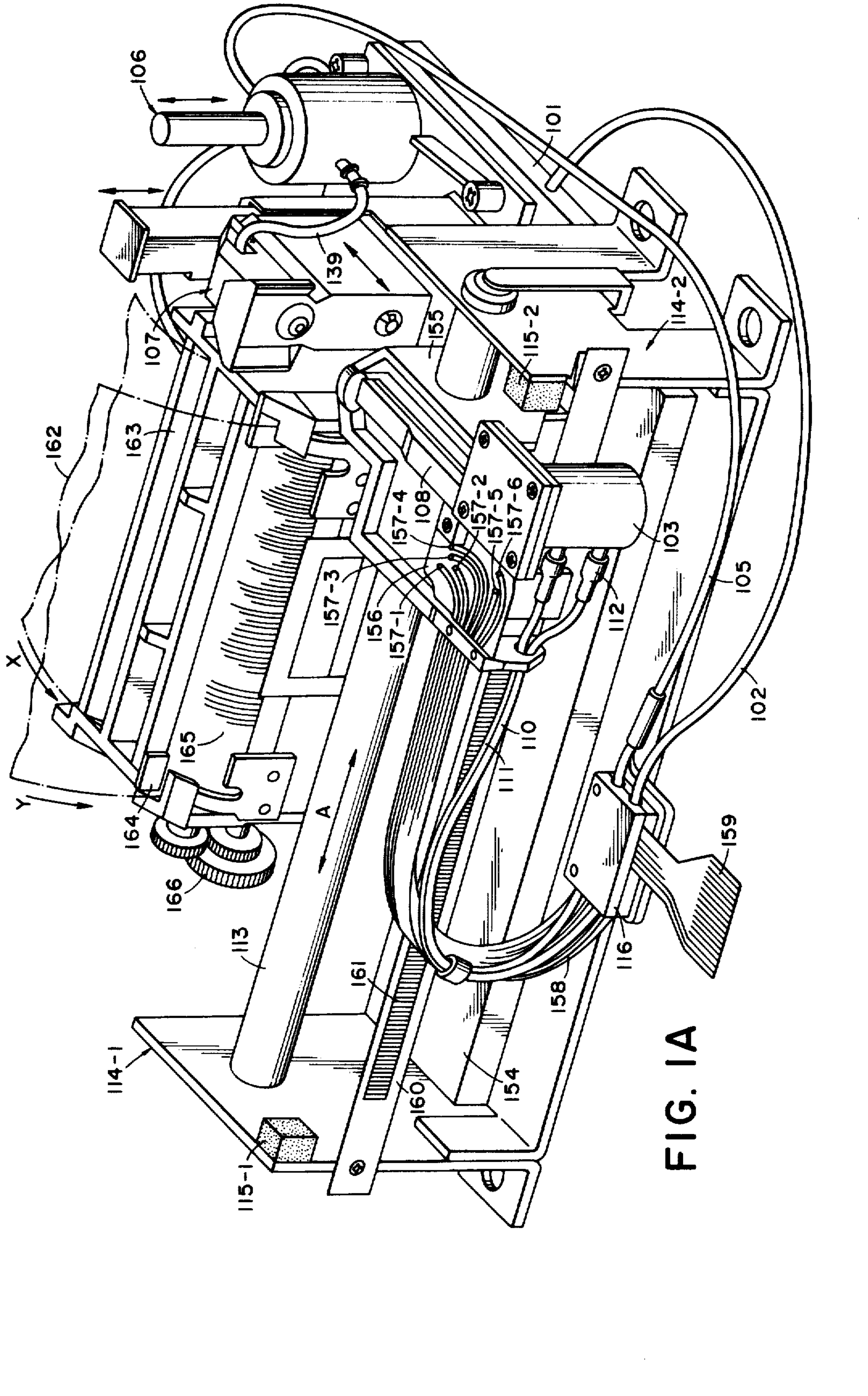
Figure 1B:
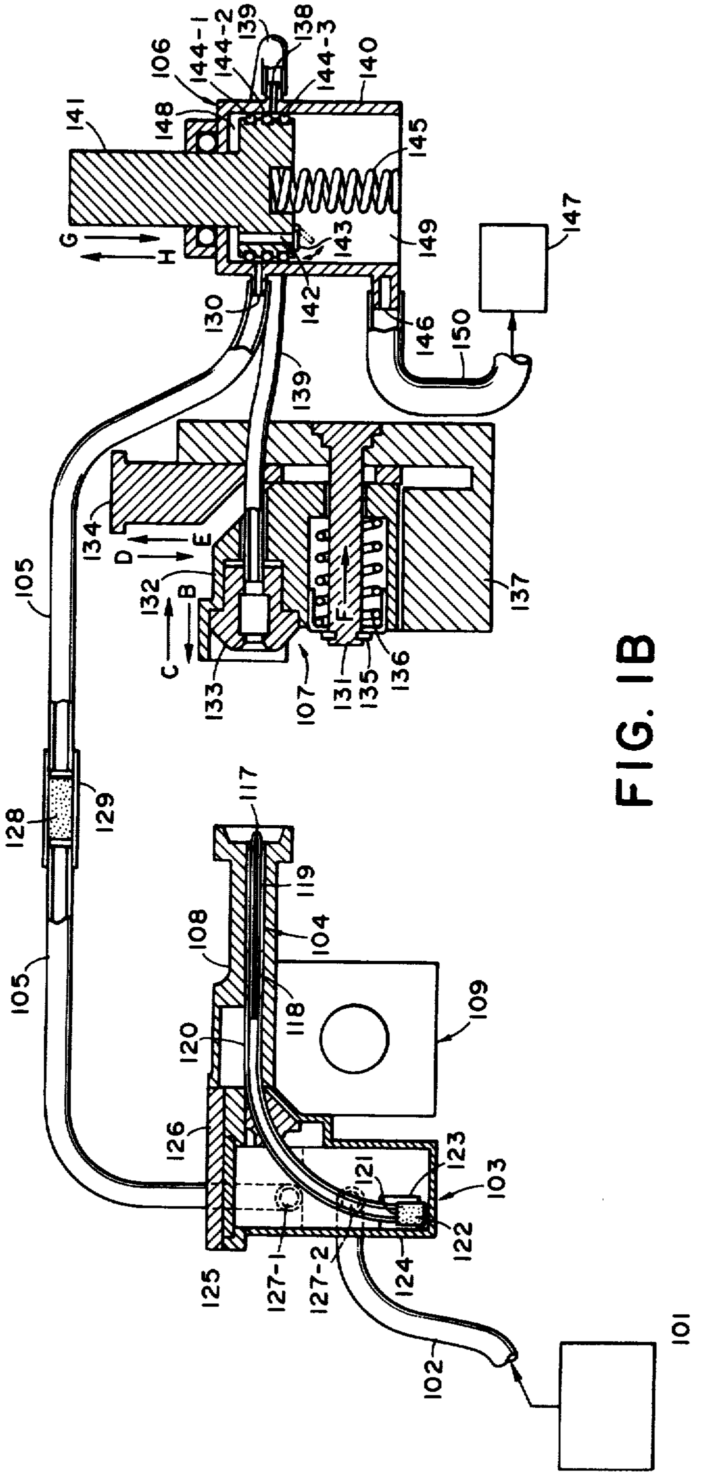
Figure 1C:
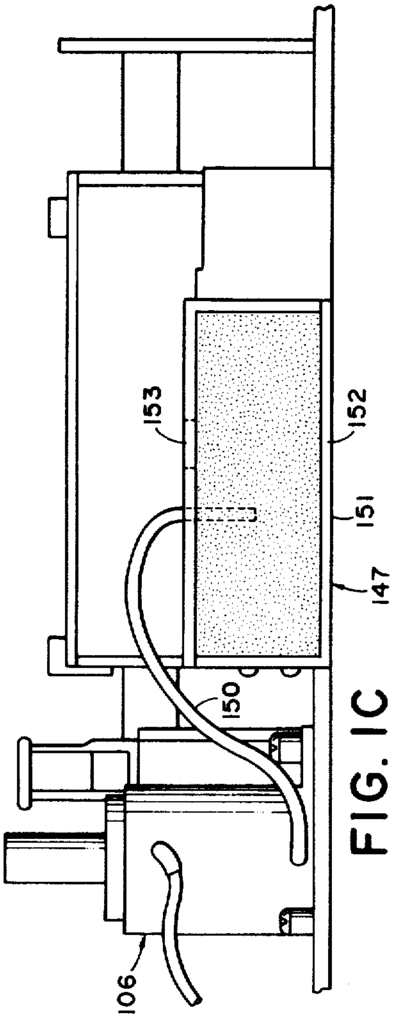

Referring to FIGS. 1A to 1C showing a preferred embodiment of the invention, the liquid jet recording apparatus includes a main tank 101, a subsidiary tank 103 in communication with the main tank through a feed tube 102, a liquid jet type recording head 104, liquid delivery means 106 and liquid receiving means 107.

The main tank 101 contains a substantial amount of recording liquid generally called ink. The subsidiary tank 103 receives the ink from the main tank 101 through the ink feed tube 102. The subsidiary tank is reciprocally movable together with the recording head 104. A connection tube 105 connects the subsidiary tank 103 with liquid delivery means 106 which is in turn connected with liquid receiving means 107 through a connection tube 139. Said liquid receiving means is engageable with the recording head at its tip portion to receive the liquid flowing out from the recording head. The recording head 104 is contained within a head holder 108 to protect the fore part of the head against external striking force and is mounted on a carriage 109 which reciprocates along the direction of a double arrow A in FIG. 1A.

The subsidiary tank 103 is in communication with the internal liquid passage of the recording head 104 and is disposed behind the head. The subsidiary tank is formed integrally with the head holder 108 so that the subsidiary tank is movable together with the recording head in the direction of double arrow A.

On the side of connection with the subsidiary tank 103, the feed tube 102 and the connection tube 105 have portions 110 and 111 respectively extending in the direction of reciprocal movement of the subsidiary tank (in the direction of the double arrow A) and movable following the movement of the tank in the direction of double arrow A. The movable portions 110 and 111 of the feed tube 102 and 105 are connected with the subsidiary tank 103 at connection portions 112. In order to achieve a higher efficiency of ink feed to the subsidiary tank 103, the connection ports are open toward the direction in which the movable parts 110 and 111 move along the arrow A.

However, the connection to the subsidiary tank may be done also in the direction normal or nearly normal to the direction of arrow A provided that the connection portion 112 of the ink feed tube is sufficiently short relative to the length of the movable part 110. In this case, it is preferred that the connection portion 112 is very short and the movable part 110 of the feed tube 102 is bent at right angles at a position very close to the subsidiary tank 103 so that the substantial length of the movable part can extend in the direction of arrow A.

By connecting the feed tube 102 to the subsidiary tank 103 and providing a movable part 110 extending in the direction of arrow A in the manner described above, the ink can be effectively supplied to the subsidiary tank 103 from the main tank 101 through the feed tube 102 relying upon the reciprocal movement of the movable part 110 of the feed tube during operation.

The efficiency of ink feed attained by the reciprocal movement of the movable part 110 of the feed tube 102 increases with an increasing of the moving speed of the movable part 110. Therefore, with this arrangement of feed tube according to the invention, a substantial speed-up can be attained without any problem in the ink supply to the subsidiary tank from the main tank. Since the movable part 110 of the ink feed tube moves together with the recording head 104, the speed of reciprocation of the recording head 104 can be increased in order to increase the frequency of ink droplet forming and thereby to increase the recording speed without accompanying any problem of over- or under-supply of ink to the recording head. An adequate amount of ink just corresponding to the amount of ink consumed by the recording head can be supplied to the subsidiary tank 103 through the feed tube 102 in proportion to the speed of recording. There occurs, therefore, no trouble of unstable ink jetting from the head or stoppage of jetting from the head.

Furthermore, it has been found that the efficiency of ink supply to the subsidiary tank 103 attained by the reciprocal movement of the movable part 110 increases or decreases in proportion to the degree of acceleration or reduction of the speed of the movable part 110. Therefore, by synchronizing the reciprocal moving speed of the movable part 110 of the feed tube with the reciprocal moving speed of the subsidiary tank 103 moving together with the recording head 104, it is assured that an adequate amount of ink always corresponding to the amount of ink consumed can be supplied to the subsidiary tank that is neither too much nor too little in accordance with the scanning speed of the recording head 104.

As readily understood from the foregoing, the above embodiment provides an efficient supply of ink to the subsidiary tank in such manner as to meet a wide range of scanning speeds for recording ranging from a low speed to a high speed. Thus, a high quality prints can be obtained for low speed recording as well as for high speed recording. Since the ink supply to the subsidiary tank 103 can be effected in accordance with the scanning speed of the recording head 104 without any problem of excess or short supply, no trouble may be caused by variation of the scanning speed. The efficiency of ink supply to the subsidiary tank 103 generally increases with increasing the gradient of acceleration or reduction in the moving speed of the subsidiary tank during its forward movement or backward movement. The efficiency of ink supply may be further increased by changing the moving direction more rapidly from forward to backward or from backward to forward. In principle, higher speed of reversal of the moving subsidiary tank 103 yields higher efficiency of ink supply through the feed tube.

In the embodiment shown in FIG. 1A, the subsidiary tank 103 and the recording head 104 are mounted on the same carriage 109 which slides forwards and backwards along a guide shaft 113. To absorb the shock to the carriage 109 at both ends of the guide shaft 113, there are provided dampers 115-1 and 115-2 made of sponge or rubber on guide shaft supporting members 114-1 and 114-2, respectively. The dampers 115 serve not only to damper the shock applied to the carriage 109 when it runs against the supporting member 114 but also to further increase the ink supply efficiency through the feed tube 102 by means of the impact of the carriage against the damper.

It is not always necessary to move the carriage 109 over its full excursion along the guide shaft up to the damper 115. By means of a driving mechanism as later described, the carriage 109 can be reversed at any point on the guide shaft midway between the two dampers 115.

As seen best in FIG. 1A, the feed tube 102 and connection tube 105 are curved so as to describe "U" and is fixed to the body of apparatus by means of a fixing plate 116 at nearly the middle of the full moving course of the carriage 109. Therefore, the movable parts 110 and 111 of the feed tube 102 and connection tube 105 on the uptream side of the fixing plate 116 can follow the movement of the subsidiary tank 103 in the direction of the double arrow A while flexing about the fixing plate serving as a pivoting point.

The movable parts 110 and 111 of the feed tube 102 and connection tube 105 are, on the other hand, attached to the carriage 109 at the same side as the subsidiary tank 103. By attachment to the carriage 109 and support with the fixing plate 116, the movable parts 110 and 111 extend along the guide shaft 113.

The arrangement and the manner of operation of the main part of the apparatus shown in FIG. 1A are described in detail hereinafter with reference to FIG. 1B. For the purpose of simplification of illustration, the main tank 101 is suggested by a block in FIG. 1B. Also, the feed tube 102 and the connection tube 105 are schematically and fragmentarily illustrated therein to show only the manner of connection thereof with other members. The position of the tubes 102 and 105 shown in FIG. 1B do not correspond to the position in which the tubes are really arranged in the apparatus (i.e. the position shown in FIG. 1A).

The recording head 104 is held by the head holder 108 and mounted on the carriage 109. The recording head 104 has a liquid jet orifice 117 at its tip portion. The recording head is essentially composed of a cylindrical member 118 and a cylindrical piezo-electric element 119. The cylindrical member 118 is made of glass or the like and so formed as to provide the above mentioned jet orifice 117. The cylindrical piezo-electric element 119 is fixedly mounted on the outer circumference of the cylindrical member 118 and so formed as to be driven by a voltage in the form of a pulse applied to the element through a lead electrode not shown. A supply tube 120 is connected to the rear portion of the recording head 104 for providing communication between the interior liquid passage of the head 104 and the subsidiary tank 103 and for supplying the ink to the head from the subsidiary tank. The supply tube 120 enters the subsidiary tank 103 at its upper portion and extends downward to the bottom of the tank. The free end of the supply tube has a liquid inlet opening 121 provided with a filter 122. The filter 122 has a number of fine liquid flow channels formed therein and is attached to the end of the tube with the aid of a mounting member 123. The filter 122 serves to filter off foreign matters such as solid particles and dust which may block the supply tube 120 and the liquid passage in the recording head 104.

As an additional function, the filter 122 dampens the wave of liquid which may be produced in the subsidiary tank 103 when the latter is vibrated. If such a wave of ink produced in the tank were to extend to the ink filled in the liquid passage within the recording head 104, then it might cause an unstable ink jet. In addition, the filter also serves to prevent any gas from entering the supply tube 120 which may be introduced into the liquid in the subsidiary tank 103 when the latter is violently moved.

The subsidiary tank 103 is provided with a liquid container body 124, a rubber sheet 125 and a cap 126. The container body 124 has an inner volume sufficient enough to receive a determined amount of liquid and is open at its top end. The upper opening of the liquid container body 124 is sealed by the rubber sheet 125 and closed airtight by the cap 126. This subsidiary tank 103 is mounted on the carriage 109 so that the subsidiary tank 103 and the recording head 104 can be carried by the carriage as a unit. To surely seal the subsidiary tank 103, the cap 126 is applied to the upper opening while pressing the rubber sheet 125 against the opening and then the cap is secured to the liquid container body 124 by suitable fastening means such as by screws. On the side wall facing the course along which the tank 103 is moved (the backside of the paper of FIG. 1B drawing), the liquid container body 124 has two opening ports 127-2 and 127-1 in communication to the feed tube 102 and the connection tube 105, respectively.

The location of the port 127-1 communicated with the connection tube 105 must be carefully selected upon designing the subsidiary tank 103 since the maximum volume of liquid to be contained in the tank 103 is substantially determined by the location of the port.

For the apparatus designed as a closed system and having a moving tank in accordance with the invention, the port 127-1 is to be located at a position lower than the upper edge of the side wall of the container body 124. More particularly, the port 127-1 is downwardly spaced from the upper edge of the side wall by a distance so selected that the liquid level in the tank 103 may lay at the level suggested by a dotted line in FIG. 1B and that there may be formed a layer of air on the liquid level. Forming such air layer within the tank is essential for a stable ink jet and also for a stable ink supply to the tank 103. The liquid level is often fluctuated by the quick change of moving direction during the recpirocal movement of the tank 103. Such moving of liquid within the tank has adverse effects on ink jetting from the recording head and jetted ink droplets get unstable. The air layer formed within the subsidiary tank 103 has the effect of minimizing the adverse effects of liquid moving on the stable ink jet. Also, the air layer has the effect of stabilizing the ink supply to the subsidiary tank 103 by a negative pressure easily formed within the tank when the ink is being jetted from the recording head 104.

The volume of such air layer to be formed within the subsidiary tank 103 must be determined in accordance with the maximum volume of ink to be contained in the tank.

The other port 127-2 communicates with the feed tube 102 and may be located above or below the above port 127-1.

In the middle of the connection tube 105 connecting between the subsidiary 103 and liquid delivery means 106 there is provided a fluid resistance regulating member 128. The resistant member is disposed to regulate the loss of head by friction within the connection tube 105. The member 128 is formed of a suitable filter material such as porous material having a large number of pass-through pores therein, felt or a bundle of many glass fibers.

When ink is delivered to the subsidiary tank 103 by operation of said liquid delivery means 106, an excess amount of ink over the necessary amount for the subsidiary tank 103 is, if any, flowed out of the tank into the connection tube 105 through the port 127-1. The overflowed ink then flows toward liquid delivery means 106. At this time, the member 128 regulating the loss of the head in-friction regulates more or less the action of resistance acting on the ink flowing toward said liquid delivery means 106. In addition, the member 128 regulating the loss of the head in-friction also serves to regulate the degree of suction acting on the ink sucked through the connection tube 105 when the trouble of printing is removed.

Regarding the filter member 128, the connection tube 105 is divided into two parts, that is, an upstream side part and a downstream side part. These two ports are connected with each other by a filter mounting tube 129.

The end of the downstream side part of the connection tube 105 is connected with an inlet port 130 provided in liquid delivery means 106.

Liquid receiving means 107 is provided for three different functions. One of the functions is to cover the tip portion of the recording head 104 thereby preventing the trouble of blocking caused by dried ink at the top portion. The second function is to recover the proper printing condition by cooperation with said liquid delivery means 106. The third function is to supply ink to the subsidiary tank 103.

Said liquid receiving means 107 is provided with a slide shaft 131, a cap holder 132 slideable along the slide shaft in the directions of arrows B and C, a cap 133 fixed to the cap holder, a capping knob 134 for sliding the cap holder 132 in the direction of arrow B, a spring 136 for sliding the cap holder in the direction of arrow C and a capping stand 137 on which all of above mentioned members are mounted so as to form a unit. The cap 133 is made of an elastic material such as rubber and has a center bore for receiving the liquid flowed out of the orifice 117. The spring 136 is disposed around the slide shaft 131 and one end of the spring is fixed to a spring griper 135.

Connected with the rear end of the cap 133 is a second connection tube 139 communicating with an inlet port 138 formed in liquid delivery means 106.

To cap the tip portion of the recording head 104 with the cap 133, the capping knob 134 is pushed down in the direction of arrow D. With the downward movement of the capping knob, the cap holder 132 is urged to move toward the orifice 117 of the recording head 104 to cover the tip portion of the head with the cap 133. The cap holder is moved in the direction of arrow B up to a position in which the cap 133 comes into a close contact with a portion of the head holder surrounding the tip of the head 104 so as to completely seal the capped portion. The cap holder 132 can be slided back in the direction of arrow C by the restoring force of the spring 136 in the direction of arrow F.

Liquid delivery means 106 is provided with a suction mechanism by which the pressure in the tank 103 can be reduced through the connection tube 105. When the suction mechanism of liquid delivery means 106 is actuated, a pressure difference is produced, through the connection tube 105, between the tank 103 and said liquid delivery means 106. By this pressure difference, there is formed a state of reduced pressure within the tank 103. The degree of pressure reduction and the holding time of the reduced pressure state are set in such manner that a determined amount of liquid can be smoothly fed to the subsidiary tank 103 from the main tank 101 through the feed tube 102.

The supply tube 120 extending from the rear end of the recording head 104 into the subsidiary tank 103 may be a tube connected with the rear end of the cylindrical member 118 disposed within the recording head or an elongation of the cylindrical member 118 itself. All of the feed tube 102, connection tubes 105 and 139, and supply tube 120 may be formed by using any known tubing material providing that it assures a smooth ink supply and that no undesirable interaction takes place between the material and the ink. A preferred example of tube used in the invention is a flexible tube made of plastics. Examples of suitable plastics include vinylidene chloride, vinylidene fluoride, polyester, polyvinyl chloride, polyethlene, and the like.

The suction mechanism of liquid delivery means 106 is of the suction pump structure and has a cylinder 140 serving as an outer frame for a suction pump and a piston 141. The piston 141 is provided with a pass-through bore 142 with a valve 143 provided at the lower end of the bore. Three O-rings 144 are disposed between the inner wall surface of the cylinder 140 and the outer circumferential surface of the piston 141. To receive the O-rings, the piston has three circumferential slots. A coil spring 146 is interposed between the lower surface of the piston and the bottom of the cylinder. If necessary, one end of the coil spring 145 is anchored to the bottom of the cylinder 140. Normally, the piston 140 is in its elevated position under the biasing force of the spring 145. At a position near the bottom, the cylinder 140 has an outlet port 146 through which the liquid sucked into the liquid delivery means 106 can flow out toward the exterior.

Although not shown in FIG. 1B, liquid absorbing means 147 is connected to the outlet port 146 as shown in FIG. 1C. Said absorbing means 147 absorbs the effluent liquid from the outlet port and allows the absorbed liquid to spontaneously evaporate. Such liquid absorbing means 147 may be formed of sponge, porous material, felt, and the like. Alternatively, a reservoir may be provided at the downstream side of the outlet port 146 to collect the effluent liquid.

Supply of recording liquid to the subsidiary tank 103 from the main tank 101 is effected by manually pressing down the piston 141 of liquid delivery means 106 in the direction of arrow G. During the downward movement of the piston 141, the pass-through bore 142 is closed by the valve 143 and the pressure in the space 148 of the cylinder 140 above the piston 141 becomes negative.

This negative pressure produced within the cylinder 140 reduces the pressure in the subsidiary tank 103 through the connection tube 105 to form a pressure difference between the subsidiary tank 103 and the main tank 101 through the feed tube 102. This pressure difference causes the ink to move from the main tank 101 to the subsidiary tank 103.

When the piston 141 has been moved down to a position in which the O-ring 144-1 is below the inlet port 130, the ink is fed into the recording head 104 from the subsidiary tank 103 so long as the tip end of the recording head 104 has previously been capped with the cap 133 and thereby a communication has been made between the recording head 104 and liquid receiving means 107. In this position, the ink in the subsidiary tank 103 is sucked into the liquid passage in the recording head 104 owing to the pressure difference formed through each of internal passages in said liquid receiving means 107, second connection tube 139 and recording head 104.

The flow of ink into the recording head 104 through liquid receiving means 107 and connection tube 139 begins at the time when the ink fed into the subsidiary tank 103 reaches a level somewhat above the liquid inlet opening 121 of the supply tube 120.

Fluid resistances in the feed tube 102 and supply tube 120 are so regulated that the flow rate of ink supplied to the recording head through the liquid inlet opening 121 is not higher than that of ink supplied to the subsidiary tank 103 from the main tank 101 so long as the liquid level of the ink fed in the subsidiary tank 103 lies near the inlet opening 121.

To attain a better prevention of gas or air bubble entering the liquid passage within the recording head 104, it is essential to start the ink supply to the recording head only after a sufficient amount of ink has already been supplied to the subsidiary tank 103. This can be realized by moving the piston 141 down in a fashion of two-set motion. As the first motion, the piston 141 is lowered to a position in which the O-ring 144-1 lies between the inlet ports 130 and 138 and then stopped at the position for a while. During the time, the pressure within the tank 103 is reduced only through the connection tube 105. This negative pressure makes the ink flow into the subsidiary tank 103 from the main tank 101. The level of the negative pressure formed within the tank 103 by the first step is higher than that necessary for supplying a sufficient amount of ink to the subsidiary tank 103. After such sufficient amount of ink has been fed into the subsidiary tank 103, the piston 141 is further pushed down as the second motion until the O-ring 144-1 comes down below the inlet port 138. In this position, a pressure difference is formed between the subsidiary tank 103 and liquid receiving means 107 through the recording head 104 so that the liquid passage within the recording head 104 can be filled with ink after the second motion.

The speed at which the piston 141 is moved down by the first and second motions and the time interval between the first and second motions are suitably determined upon designing the apparatus in such manner that a smooth and desirable supply of ink to the subsidiary tank 103 as well as to the recording head 104 can be effected. However, if the size and shape of the feed tube 102, connection tube 105, supply tube 120, opening ports 127-1 and 127-2, and inlet opening 121 are suitably selected as desired and also the size of inlet ports 130 and 138 are suitably designed in connection with the selected shape and size of the above tubes and openings, then the piston 141 may be moved down continuously without moving the piston down in a fashion of two-step motion.

With the downward movement of the piston 141, the level of ink in the subsidiary tank 103 gradually rises up. When the liquid level rises up to a position above the opening 127-1, the ink supplied into the subsidiary tank begins flowing into the upper space 148 within the cylinder 140 through the connection tube 105 and the inlet port 130. The recording liquid thus flowed into the upper space 148 also flows into the pass-through bore 142 and then it is allowed to flow down into the lower space 149 within the cylinder 140 when the valve 143 is opened (when the piston is pushed up in the direction of arrow H). When the piston 141 reaches the lower dead point, it is backed to the normal position in the direction of arrow H) by the resilient force of the spring 136. During this upward movement of the piston, the valve 143 is opened owing to the pressure difference between the bore 142 and the space 148. Now, the upper space 148 in the cylinder is communicated with the atmosphere through the outlet port 146. Since the valve 143 is opened, the liquid in the bore 142 and space 148 is allowed to flow down into the lower space 149 in the cylinder 140.

As previously noted, the piston 141 in the embodiment shown in FIG. 1B has three O-rings disposed on the circumferential surface. These three O-rings 144-1, 144-2, and 144-3 are located in such manner that when the piston 141 is in its normal position (its upper dead point), the piston and these O-rings close the inlet ports 130 and 138. If a printing problem is caused by a retrogradation of the meniscus at the tip portion of the recording head due to a blocking of liquid passage within the head 104 or a level drop of the liquid within the subsidiary tank 103, the trouble can be removed very easily and the apparatus can be restored to its proper printing state by a printing recovery operation which is carried out essentially in the same procedure as above. Hereinafter, the manner of operation for recovering the proper printing condition will be described briefly.

In general, the apparatus gets in printing disorder in the following cases:

If the liquid in the subsidiary tank 103 is decreased for any reason and the liquid level drops, then the meniscus moves back too much away from the orifice 117 of the recording head 104. This causes printing trouble.

Secondly, if an extraordinarily large shock is applied to the subsidiary tank 103 and recording head 104 at the time of return during their reciprocal movement for printing, then the meniscus is moved backwards to such extent that it can no longer return to its original position. Such retrogradation of the meniscus will cause a trouble of unstable jetting of ink droplets or, in the worst case, a trouble of inability to jet ink droplets.

Thirdly, a printing trouble is caused by entrance of an air bubble into the recording head 104 which tends to happen during the reciprocal motion of the subsidiary tank 103.

Lastly, there is the case where any liquid passage, for example, the liquid passage in the recording head 104 is blocked by dried ink or any foreign matters undesirably introduced thereto.

If any printing trouble is caused by any one of the above mentioned reasons, the damaged printing condition can be recovered in the following manner:

At first, the cap 133 is connected with the tip of the recording head 104 and then the piston 141 is pushed down in the direction of arrow G carefully. At the first step of the downward movement of the piston, O-ring 144-1 passes over the inlet port 130 and therefore the upper space 148 within the cylinder 140 gets in communication with the subsidiary tank 103 through the connection tube 105. Owing to the negative pressure formed in the cylinder 140, air above the liquid level in the subsidiary tank 103 is sucked so that ink is sucked into the subsidiary tank 103 from the main tank 101. Since the inlet port 138 is closed by O-rings 144-1 and 144-2 at this time, there takes place no flow of ink through the recording head 104 at this stage of operation.

When the piston is further pushed downward as the second step of operation, O-ring 144-1 passes over the inlet port 138. The inlet port 138 is, therefore, allowed to communicate with the interior of the cylinder 140 so that ink is sucked through the recording head 104 and liquid receiving means 107. At this step, if there is any matter by which the trouble of blocking has been caused, the matter is also sucked into the upper space 148 within the cylinder 140 together with the ink then sucked. When the piston 141 is moved back upwards, the valve 143 is opened, and the sucked ink and the sucked foreign matter, if any, flow down into the lower cylinder space 149, and then they are exhausted out of liquid delivery means 106 through the exhaust port 146. The outflow from the exhaust port is absorbed into the liquid absorbing means 147. Thus, the apparatus is restored to its original proper state for printing.

As readily understood from the foregoing, the arrangement of the apparatus according to the invention has many advantages.

When the piston 141 is pushed down in the direction of arrow G, the air remaining in the subsidiary tank 103 is at first sucked and then the ink is fed into the subsidiary tank 103 from the main tank 101 as a result of the air suction. Ink is sucked into the recording head 104 only after the rear end opening of the supply tank 120 has completely been dipped under the ink fed into the subsidiary tank 103. Therefore, air is prevented from coming into the liquid passage within the recording head 104 together with the supplied ink.

By repeating the push-down of the piston 141 as desired, the level of liquid within the subsidiary tank 103 is raised up and finally it reaches the level of the opening 127-1. After once reached the level, the liquid supplied to the tank 103 is sucked out through the opening 127-1. Therefore, the liquid level in the tank 103 is maintained at the level of the opening expressed by the dotted line in FIG. 1B. In this position, a layer of air in a certain amount exists above the liquid level in the tank 103. As previously noted, this air layer serves as a shock absorber and has an effect to absorb the impacting pressure which may be applied to the tank during its reciprocal movement.

As shown best in FIG. 1C, liquid absorbing means 147 is connected with liquid delivery means 106 by the exhaust tube 150 so that the liquid exhausted from said liquid delivery means 106 through the exhaust tube 150 with the up-and-down operation of the piston 141 can be received in said liquid absorbing means 147. Said liquid absorbing means comprises a hard casing 151 and a liquid absorber 152 encased in the casing. The liquid absorber 152 may be formed of such material having a large volume for containing liquid and a high absorbency for liquid. Preferred examples thereof are glass wool, felt and porous body.

The hard casing 151 has an opening 153 provided in the upper wall so as to allow spontaneous evaporation of the absorbed liquid in the absorber 152.

The mechanism for operating the apparatus shown in FIG. 1A will be described hereinafter.

The carriage 109 carrying thereon the recording head 104 and the subsidiary tank 103 is driven and controlled by a linear motor. The linear motor includes a permanent magnet 154, the guide shaft supporting member 114 serving as a magnetic yoke plate and the guide shaft 113 which together form a closed magnetic circuit. A uniform magnetic field is formed between the permanent magnet 154 and the magnetic guide shaft 113. A coil bobbin 155 is formed integrally with the carriage 109. Although not shown in FIG. 1A, a coil is disposed around the coil bobbin 155. The carriage is mounted on the magnetic guide shaft for slide movement along the shaft in such a way that a portion of the coil crosses the above magnetic field at right angles. With this arrangement, when electric current is applied to the coil on the coil bobbin 155, there is produced a driving force according the known Fleming's righthand rule by which the carriage 109 is driven reciprocally running on and along the guide shaft 113. The reciprocation of the carriage along the guide shaft is effected by using the fact that the direction of the driving force is changed by changing the direction of current flowing through the coil around the coil bobbin 155.

The carriage 109 has an electric connection plate 156 fixed thereto. On the upper surface of the connection plate 156 there are fixed terminals 157-1, 157-2, of the coil, terminals 157-3, 157-4 of the piezo-electric element 119, terminal 157-5 of a light emitting diode (not shown) for detecting the position of the carriage 109 and terminal 157-6 of a photo-transistor (not shown). These terminals are electrically connected with flexible cables 158 fixed to one end of the connection plate 156. The cables extending from the connection plate 156 are bent back to the fixing plate 116 by which the cables are fixed to the body of apparatus. Ther terminals of the bent end portions of cables 158 are connected to a connector 159 so as to control the driving of carriage 109 and the piezo-electric element 119 of the recording head 104 through the flexible cables 158.

Designated by 160 is an optical slit having a large number of slits 161 arranged at regular intervals. The optical slit 160 is disposed in the space between the light emitting diode and photo-transistor arranged opposite each other on the carriage 109. The light emitting diode and photo-transistor function as a pair of timing pulse generating elements.

A recording paper 162 on which printing is to be made with the recording head 104 is inserted into the apparatus through an insertion slot 163 in the manner expressed by arrow X. With the rotation of a paper feed roller 165, the recording paper 162 is discharged from the apparatus in the direction of arrow Y through a discharge slot 164. In FIG. 1A, the recording paper 162 is represented by chain-dotted lines.

The paper feed roller 165 is rotated in synchronism with the printing timing of the recording head 104 by a gear 166 which transmits to the paper feed roller the turning force of a pulse motor (not shown). The direction in which the paper feed roller 165 is rotated by the gear 166 is the direction to move the recording paper forwards (in the direction of arrow Y).

The type and structure of the recording head used in the invention are never limited to that shown in FIG. 1A. Many types of recording head hitherto known may be used in the invention. For example, there may be used recording heads employing piezo-electric element as disclosed in U.S. Pat. Nos. 3,683,212; 3,946,398 and 3,747,120, recording heads employing thermal energy as disclosed in DE-OS No. 2,843,064 and modifications thereof. Further, there may be used also such type of recording head adaptable in a liquid jet recording apparatus according to the so-called continuous droplet forming process in which the direction of flying droplets is controlled.

Figure 2B:
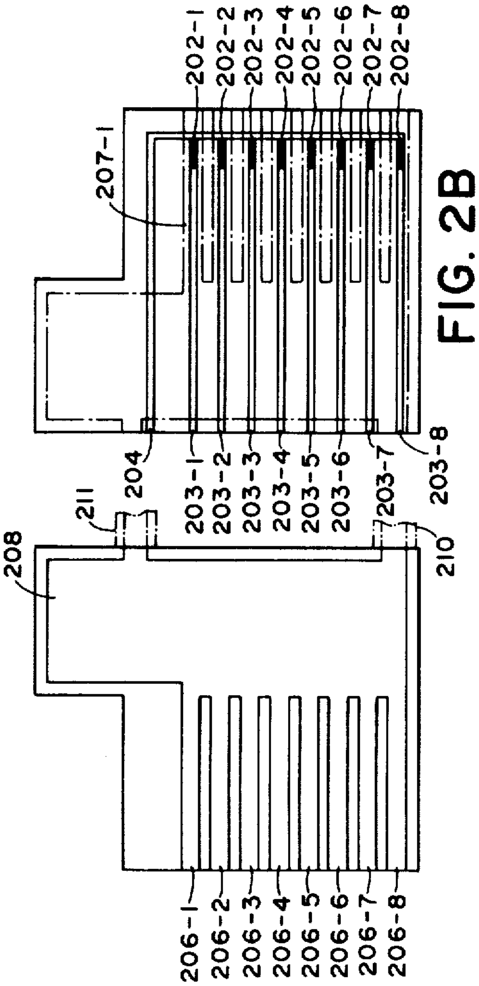
Figure 2A:
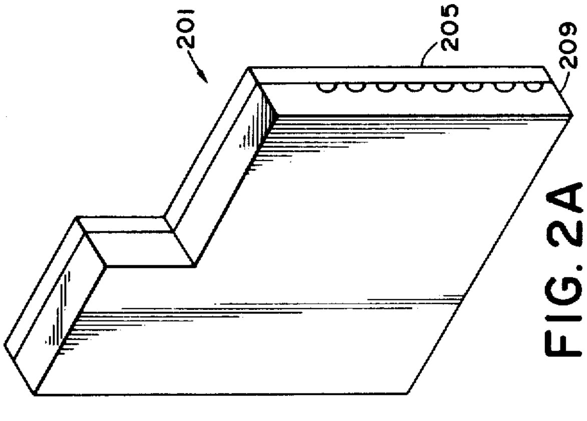

The recording head shown in FIGS. 2A and 2B is of the same type as that disclosed in the above-mentioned DE-OS No. 2,843,064 although a slight modification in shape has been made therein to accommodate the recording head to the apparatus according to the invention.

Referring to FIGS. 2A and 2B, the recording head 201 comprises eight heating elements 202, eight selection electrodes 203, a common electrode 204, a heating element base plate 205 and a grooved plate 209. The heating elements 202 generate heat useful as ink jet energy. The selection electrodes 203 apply a voltage to the heating elements 202, respectively for selectively driving the elements. The heating elements 202 are connected to the common electrode 204. The eight heating elements 202, the common electrode 204 and the eight selection electrodes 203 are arranged on the base plate 205. The grooved plate 209 has eight grooves 206 mating with the eight heating elements 202. These grooves 206 on the plate 209 and the side surfaces of the eight heating elements 202 on the base plate 205 together form eight liquid passages 207. The grooves plate 209 has also a concavity to form a common liquid chamber 208 in communication with the eight liquid passages 207. Recording liquid is supplied to the respective passages from the common liquid chamber 208 in the recording head.

Mounted on the rear side of the common liquid chamber 208 are a feed tube 210 for receiving recording liquid from a main tank and a connection tube 211 for connecting the common liquid chamber 208 with liquid delivery means.

The function of the common liquid chamber 208 is essentially the same as that of the subsidiary tank previously described with reference to FIG. 1. If the inner volume capacity of the common liquid chamber 208 is small, it is desirable that an intermediate tank moving together with the recording head 201 is provided between the main tank and the common liquid chamber 208. If the common liquid chamber 208 has such air layer formed above the liquid level which is sufficiently effective to damp the moving of the liquid surface caused by the reciprocal motion of recording head 201, then it is not always necessary for the intermediate tank to have a space for forming such air layer useful for the same purpose.

While the invention has been particularly shown and described with reference to preferred embodiments thereof, it will be understood by those skilled in the art that the foregoing and other changes in form and details can be made therein without departing from the spirit and scope of the invention.

What we claim is:

1. A liquid jet recording apparatus comprising:
- a first ink tank for storing an amount of ink;
- a second ink tank position at a level higher than said first ink tank, and connected to a feed tube in communication with said first ink tank, said second ink tank receives the ink from said first tank through the feed tube, said first ink tank and said second ink tank being closed containers;
- a recording head associated with said second ink tank for jetting the ink fed from said second ink tank; and
- a carriage connected to said second ink tank and said recording head for reciprocally moving said second ink tank and said recording head together, wherein at least a portion of the feed tube is moved along the reciprocal movement path of said second ink tank thereby producing pressure in said second ink tank to feed the ink to said second ink tank from said first ink tank.

2. An apparatus as set forth in claim 1 wherein said feed tube is formed of a flexible tube.

3. An apparatus as set forth in claim 1 wherein said second ink tank is so formed as to contain a layer of air in contact with the level surface of the ink within the tank.

4. An apparatus as set forth in claim 1 which further comprises suction means for said recording head and second ink tank.

5. An apparatus as set forth in claim 1 which further comprises a capping mechanism engageable with said recording head.

* * * * *